United States Patent Office 2,980,871
Patented Apr. 18, 1961

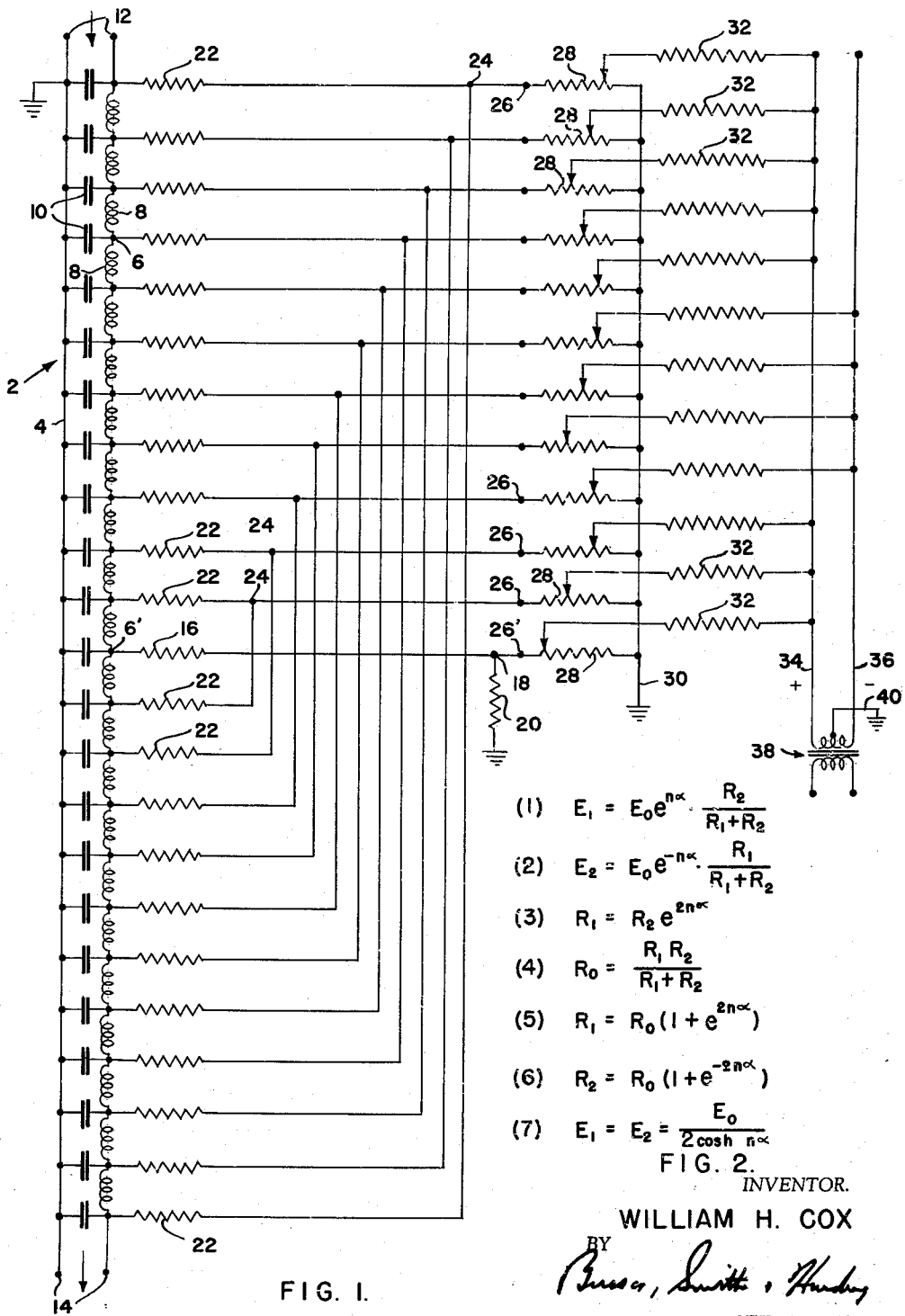
(1) $E_1 = E_0 e^{n\alpha} \cdot \dfrac{R_2}{R_1+R_2}$
(2) $E_2 = E_0 e^{-n\alpha} \cdot \dfrac{R_1}{R_1+R_2}$
(3) $R_1 = R_2 e^{2n\alpha}$
(4) $R_0 = \dfrac{R_1 R_2}{R_1+R_2}$
(5) $R_1 = R_0(1+e^{2n\alpha})$
(6) $R_2 = R_0(1+e^{-2n\alpha})$
(7) $E_1 = E_2 = \dfrac{E_0}{2\cosh n\alpha}$

2,980,871

ELECTRICAL WAVE FILTER

William H. Cox, Beaumont, Tex., assignor to Sun Oil Company, Philadelphia, Pa., a corporation of New Jersey Filed Aug. 5, 1957, Ser. No. 676,080

4 Claims. (Cl. 333—28)

This invention relates to electrical wave filters and has particular reference to filters of the delay line type.

In my application, Serial No. 464,843, filed October 26, 1954, now abandoned, there is described, particularly in connection with the analysis of seismic records, a type of filter in which a wave is analyzed against a predetermined waveform or "wavelet." In brief, in accordance therewith, desired signals are separated from noise on the basis of wave shape or "character" instead of frequency content only, the filtering being particularly adapted for the detection of transients. In effect, at any instant of time the waveform undergoing analysis is multiplied by corresponding values of a predetermined wavelet, and integration of the product is taken over a predetermined time period of the waveform. The integration is most readily carried out in the form of a summation of discrete values of the product of the waveform by the wavelet, and this summation is most readily accomplished by feeding the waveform to be analyzed to a delay line provided with suitably spaced taps from which values are taken, each of which is effectively multiplied by a value corresponding to an ordinate of the wavelet and the resulting discrete products are then summed to provide an output.

An actual delay line is necessarily made up of components which have finite electrical loss. That is, a signal will be attenuated as it travels down the delay line. For proper results, there must be compensation for this attenuation by an adjustment of the amplitude multiplying factors to provide the desired filter characteristic. This would ordinarily involve a considerable amount of calculation, particularly if the shape of the wavelet involved in the analysis is changed. The present invention relates particularly to compensation for the attenuation and involves a relatively simple arrangement of resistors particularly in view of the fact that the wavelet patterns ordinarily of significance are symmetrical, corresponding to symmetry of the multiplying factors with respect to the center of the delay line. Symmetry is particularly desired to eliminate phase distortion of the signal. If, then, the ordinate patterns are limited to the class of symmetrical ones, an ordinate pairing circuit may be used to simplify the procedure of changing filter properties. Line loss compensation and pairing of symmetrical ordinates may be built into a fixed part of the circuit. Only one additional amplitude adjustment per ordinate pair is then needed to obtain any symmetrical ordinate pattern or time function corresponding to the wavelet. Computation of resistor values of the part of the attenuation network which must be varied is considerably simplified in accordance with the invention. The resulting effect is equivalent to producing, substantially, an output from an ideal delay line involving no loss, deviation from such an ideal line being so slight as to be negligible in practice.

While my prior application particularly relates to the use of wavelet filtering in connection with the analysis of seismic records, it will be apparent that wavelet filtering is of more general applicability particularly for the detection of transients of predetermined waveform in any type of wave or record.

The general object of the invention is the provision of means in such a filtering arrangement adapted to compensate for delay line losses. Other objects of the invention will become more apparent from the following description, read in conjunction with the accompanying drawing, in which:

Figure 1 is a wiring diagram showing in association with a delay line of a wavelet filter the particular means to which the present invention relates; and Figure 2 shows certain formulae which are involved in calculations in accordance with the invention, and are explanatory thereof.

Referring first to Figure 1, there is indicated at 2 a delay line to which there is fed the waveform undergoing analysis. This line may be of many types well known in the art, but for simplicity of illustration it is shown as having sections each of which is grounded at 4 and tapped at 6 between sections, the sections being pi sections provided by inductances 8 and capacitances 10. Other known types of delay lines may be used. The input terminals of the line are indicated at 12 and the output terminals indicated at 14. As illustrated, the delay line is symmetrical about the center tap 6' to which there is connected the resistor 16 leading to a terminal 18 connected to ground through a resistor 20 having the same resistance value as resistor 16. Pairs of taps symmetrically disposed about the center tap 6' are connected through resistors 22 to terminals 24, each of the latter of which then corresponds to a symmetrically located pair of taps 6. The invention particularly relates to the provision of resistors 22 which compensate for the loss characteristics of the line. As shown in Figure 1, the terminal 18 is connected to a terminal 26', and each of the terminals 24 is connected to a corresponding terminal 26. These latter terminals may be constituted by plugs receivable in sockets which are connected, as will be presently described, to other parts of the apparatus. The system is such that at the terminals 26 and 26' signals are delivered having such relative amplitude as to correspond substantially to a loss-less delay line. The assembly comprising the delay line and resistors 16 and 22 and their corresponding terminals may provide a unit which need not be changed if the reference wavelet is changed. In other words, once the resistors 16 and 22 are determined in value, the outputs from the terminals 26 and 26' may be quite arbitrarily treated without change of the delay line assembly. Furthermore, the wavelet-characterizing devices connected to these output terminals need not be calculated in the light of the loss characteristics of the line.

Passing for the moment the matter of determining the values of the resistors 16 and 22, the devices adjustable for different wavelet forms may now be described.

To each of the terminals 26 and 26' there is connected the resistance of a potentiometer 28, the opposite terminal of each of these being grounded as indicated at 30. The contacts of these potentiometers are adjusted in accordance with the wavelet involved in the filtering and are connected through adding resistors 32 to one or the other of a pair of lines 34 and 36 which deliver an output through a transformer 38, the center tap of the primary of which is grounded as indicated at 40. The lines 34 and 36 respectively correspond to assignment of positive and negative values to the inputs thereto and, as shown, are connected to the end terminals of the primary of transformer 38. For reference they are respectively designated by the plus sign for a positive assignment of value and a minus sign for a negative assignment of value. (These signs, of course, do not indicate direct current relationships in this instance.) The ratio of resistance values of the potentiometers provided between their adjustable contacts and ground to the total (equal) resistances of the potentiometers correspond to ordinates of the reference wavelet. As illustrated, the wavelet may be considered as having at its center of time symmetry a maximum positive ordinate with the ordinates remaining positive through the third ordinate, the fourth, fifth, sixth and seventh ordinates being negative, with the wavelet then going positive and running to a low value at the end ordinates illustrated. It will be noted that the connections are to the positive line 34 when the ordinates are positive and to the negative line 36 when they are negative.

The resistors 32 may be of high equal value and provide for the separate summing of the respective inputs to the lines 34 and 36.

While a simple arrangement is illustrated, involving resistors only, it may be desirable, if very high accuracy is desired, to interpose in the connections isolating means such as cathode followers, but such isolating means are not generally necessary for accuracies required in practice.

The operation is such that if the delay line were assumed loss-less, there would be delivered to each of the terminals 26 a signal corresponding to one-half the sum of the signals appearing at the delay line taps connected through a pair of resistors 22 to such terminals. Actually, this is the effect achieved as will become justified hereafter. The signal thus appearing at a terminal 26 is effectively multiplied, by reason of voltage division at the potentiometers 28, by a value corresponding to a wavelet ordinate, the multiplication factor being the ratio of the potentiometer resistance between the potentiometer contact and ground to the total resistance of the potentiometer. These individual products are then added through resistors 32 and delivered to the respective lines 34 and 36. In view of the factor of one-half which is introduced, the signal appearing at tap 6' is also halved by the arrangement of the equal resistors 16 and 20.

Since, in accordance with the invention, the delay line arrangement as it appears at the terminals 26 and 26' is substantially loss-less, it will be evident that the adjustments of potentiometers 28 may be made without regard to actual line loss, and may, accordingly, be made in accordance with the wavelet ordinates to which they correspond.

There will now be described the determination of values of the resistors 22 to secure the effect of a substantially loss-less delay line and the attainment of the same impedance at each terminal 26. The same source impedance, of course, must be presented by each terminal 26 to the adjustable part of the circuit involving the potentiometers 28.

It will suffice to consider a single pair of taps 6 symmetrically related to the center tap 6'. The subscript 0 appended to a term relates to the center tap 6'; the subscript 1 refers to the tap 6 under consideration which lies on the input side of the center tap; and the subscript 2 relates to the terminal 6 under consideration which lies toward the output side with respect to the center tap 6'. $n$ is used to designate the number of filter sections between the center tap and each of the pair of symmetrically located taps 6 under consideration. $\alpha$ represents the attenuation corresponding to a single filter section. $e$ is the base of natural logarithms. $R_1$ and $R_2$ are values of the respective resistors 22 associated with the taps under consideration.

Considering $E_0$ to be an instantaneous value of a waveform on the delay line as it appears at terminal 6', then the same instantaneous value of the waveform when it appears at the taps under consideration will produce, as measured at the corresponding terminal 26, equivalent internal voltages at the source which are $E_1$ and $E_2$ given by the Equations 1 and 2 shown in Figure 2. (These equations do not exhibit the constant voltage dividing factor for each pair of taps introduced by the relative values of the constant resistances of the potentiometers 28 and the constant source resistances appearing at the terminals 26 and 26', the last being as hereafter described. In the calculations this factor drops out.) These results follow from conventional delay line theory. If the delay line were loss-less, $\alpha$ would be 0, and for $E_1$ to be equal to $E_2$, $R_1$ would be equal to $R_2$. In the case of the actual line it is desired to have $E_1$ equal to $E_2$, and $R_1$ and $R_2$ must be relatively chosen to secure this equality. By equating $E_1$ to $E_2$, and solving for the ratio of $R_1$ to $R_2$, Equation 3 is obtained.

It will be noted that this equation does not give definite values to the resistances but only their ratios. It is now desired to provide at every terminal 26 the same impedance looking toward the delay line, and this impedance should be that appearing, looking toward the delay line, at terminal 26'. Equation 4 represents this requirement, neglecting the negligible contribution to the impedance due to the source impedance of the delay line itself and the source feeding the delay line, the delay line inductors and source being chosen to exhibit resistances very small in comparison with the values of resistors 22. $R_0$ is the desired impedance. By the simultaneous solution of Equations 3 and 4, there are obtained the values $R_1$ and $R_2$ given in Equations 5 and 6, for the respective resistances 22 of each pair. These values, it will be noted, are in terms of the desired impedance, the given attenuation of each filter section, and the spacing, in terms of number of filter sections, between taps under consideration and the center tap of the line.

It may here be noted that while for a corresponding pair of taps $E_1$ and $E_2$ are equal, these values are not, strictly speaking, the same as those for pairs of taps differently spaced from the center tap. In fact, derived from the foregoing, $E_1$ and $E_2$ are as specified in Equation 7 in Figure 2. However, the attenuation constant $\alpha$ will usually be very small, and since the hyperbolic cosine varies only slightly from unity for small values of its argument, the fraction multiplying $E_0$ will generally closely approximate one-half for all taps of the filter. If the very small correction involved in Equation 7 is to be taken into account, that may be done in the setting of adjustments of the potentiometers. For most purposes, such as those involved in seismic wave analysis, such correction is unnecessary. It will be noted that the potential appearing at terminal 26, is $E_0/2$.

From the foregoing it will be evident that when the resistors 22 are chosen in accordance with the foregoing, the delay line assembly as it appears at the terminals 26 and 26' is, effectively, a loss-less line. Accordingly, once this arrangement is set up, there is no further need to take into account attenuation in the line.

While in accordance with the foregoing an even number of sections in the delay line has been assumed, it will be evident that corresponding considerations may be used for providing, in effect, a substantially loss-less delay line if an odd number of sections are used. Symmetry of the delay line and of the reference wavelet leads, in accordance with the invention, to the possibility of simple setting of the potentiometers as described above.

What is claimed is:

1. In combination, a delay line comprising sections connected at taps, said delay line being of a type to provide delay of signals introduced thereto without substantial distortion of the wave shape thereof, and said delay line being symmetrical with respect to its center, a terminal corresponding to each pair of taps disposed symmetrically with respect to the center of the delay line, and resistors connecting each of said terminals with the two taps, and only to the two taps, to which it corresponds, said resistors constituting means for substantially compensating for attenuation in the delay line so that the output signal components at each terminal originating at its corresponding taps are substantially equal for a given event of a wave traversing the delay line, and an adjustable voltage divider connected to each of said terminals and receiving signals therefrom.

2. In combination, a delay line comprising sections connected at taps, said delay line being of a type to provide delay of signals introduced thereto without substantial distortion of the wave shape thereof, and said delay line being symmetrical with respect to its center, a terminal corresponding to each pair of taps disposed symmetrically with respect to the center of the delay line, and resistors connecting each of said terminals with the two taps, and only to the two taps, to which it corresponds, said resistors constituting means for substantially compensating for attenuation in the delay line so that the output signal components at each terminal originating at its corresponding taps are substantially equal for a given event of a wave traversing the delay line, and for providing that the input impedances at said terminals are substantially equal, and an adjustable voltage divider connected to each of said terminals and receiving signals therefrom.

3. In combination, a delay line comprising sections connected at taps, said delay line being of a type to provide delay of signals introduced thereto without substantial distortion of the wave shape thereof, and said delay line being symmetrical with respect to its center, a terminal corresponding to each pair of taps disposed symmetrically with respect to the center of the delay line, resistors connecting each of said terminals with the two taps, and only to the two taps, to which it corresponds, said resistors constituting means for substantially compensating for attenuation in the delay line so that the output signal components at each terminal originating at its corresponding taps are substantially equal for a given event of a wave traversing the delay line, an adjustable voltage divider connected to each of said terminals and receiving signals therefrom and having an output connection, and a pair of lines connected by adding resistors to the output connections of said voltage dividers.

4. In combination, a delay line comprising sections connected at taps, said delay line being of a type to provide delay of signals introduced thereto without substantial distortion of the wave shape thereof, and said delay line being symmetrical with respect to its center, a terminal corresponding to each pair of taps disposed symmetrically with respect to the center of the delay line, and resistors connecting each of said terminals with the two taps, and only to the two taps, to which it corresponds, said resistors constituting means for substantially compensating for attenuation in the delay line so that the output signal components at each terminal originating at its corresponding taps are substantially equal for a given event of a wave traversing the delay line, and for providing that the input impedances at said terminals are substantially equal, an adjustable voltage divider connected to each of said terminals and receiving signals therefrom and having an output connection, and a pair of lines connected by adding resistors to the output connections of said voltage dividers.

References Cited in the file of this patent

UNITED STATES PATENTS

| 2,444,063 | Pfleger | June 29, 1948 |
| 2,743,367 | Felch et al. | Apr. 24, 1956 |
| 2,759,044 | Oliver | Aug. 14, 1956 |
| 2,760,164 | Graham et al. | Aug. 21, 1956 |

OTHER REFERENCES

Corrington et al.: RCA Review, vol. 15, No. 2, June 1954, pages 163–186.